Jan. 24, 1956 R. WELSH 2,731,912
METHOD AND APPARATUS FOR APPLYING RESINOUS
OR THERMOPLASTIC COLORS TO OBJECTS
Filed March 23, 1950 2 Sheets-Sheet 1

Inventor
Regis Welsh
By Christy, Parmelee & Strickland
Attorneys

Jan. 24, 1956
R. WELSH
2,731,912
METHOD AND APPARATUS FOR APPLYING RESINOUS
OR THERMOPLASTIC COLORS TO OBJECTS
Filed March 23, 1950
2 Sheets-Sheet 2
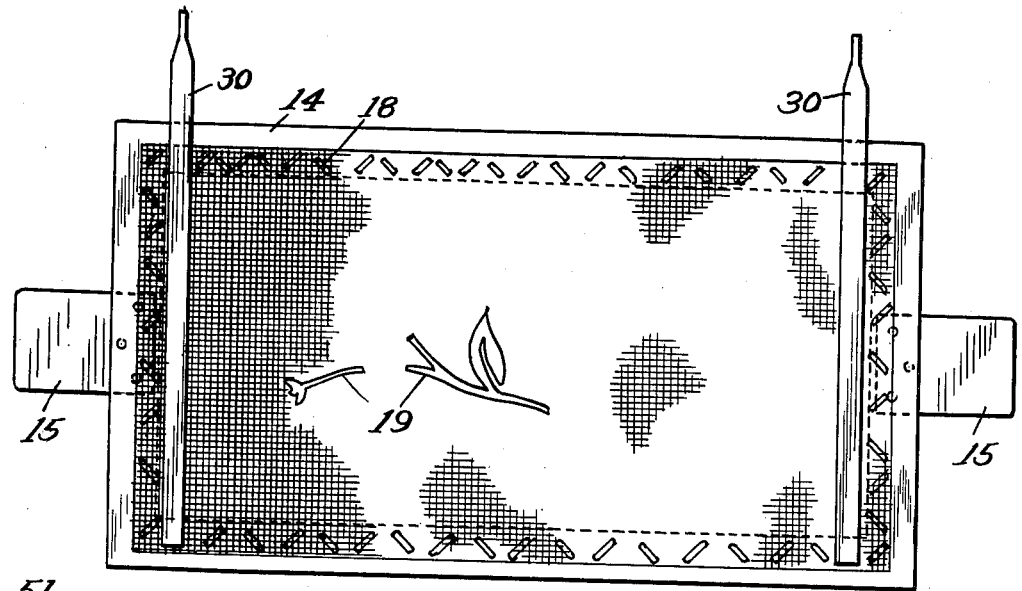
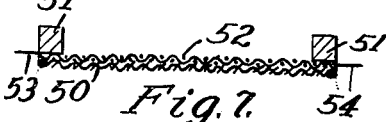
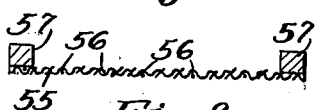
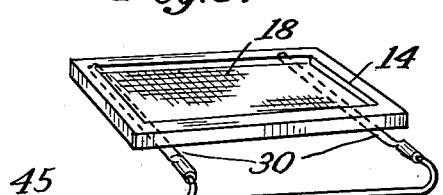
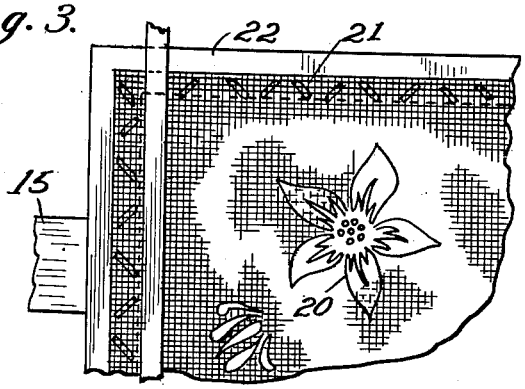
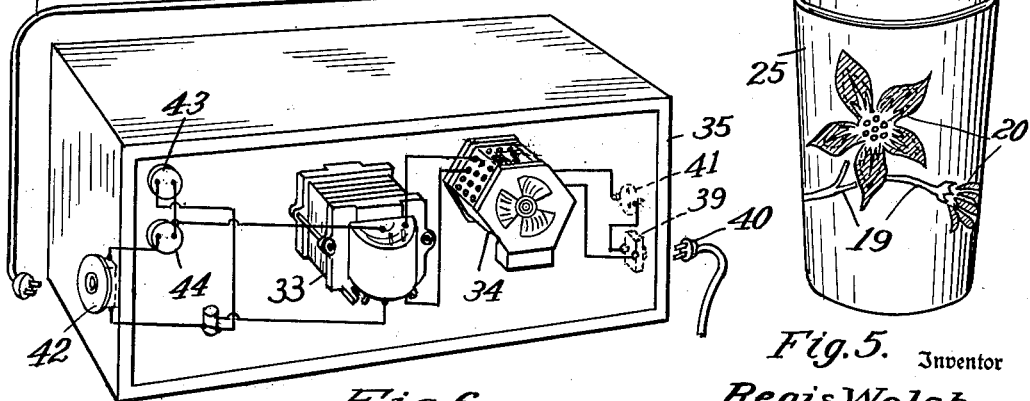
Inventor
Regis Welsh
By
Christy, Parmelee & Strickland
Attorneys United States Patent Office 2,731,912
Patented Jan. 24, 1956

2,731,912

METHOD AND APPARATUS FOR APPLYING RESINOUS OR THERMOPLASTIC COLORS TO OBJECTS

Regis Welsh, Pittsburgh, Pa., assignor to The O. Hommel Company, Pittsburgh, Pa., a corporation of Pennsylvania Application March 23, 1950, Serial No. 151,366

7 Claims. (Cl. 101—129)

This invention relates to the application of color to objects such as ceramic ware, i. e., china, glass or porcelain-enamel ware, or other materials including wood, metal, etc., by what is commonly referred to as "screening," and, in particular, a method and apparatus for screening thermoplastic or resinous coloring compounds onto the objects and keeping it in a proper fluid condition during application.

In the process of decorating objects such as ceramic ware by screening, a fine mesh screen is used, and areas of this screen are masked or coated over, and the uncoated or unmasked areas provide a pattern of the desired outline or contour through which coloring material is forced by movement of a squeegee over the screen. This process is widely used at the present time, but mostly for the application of a single color to the object to be decorated. Where more than a single color is used, the color or paint first applied must be allowed to thoroughly dry or harden before any succeeding color can be put onto the ware. This is expensive and requires considerable handling and labor. It has heretofore been proposed to use colors of a thermoplastic character which are maintained in a liquid condition until forced through the screen into contact with the ware. Upon contact with the ware which is relatively cold, the thermoplastic material quickly hardens so that the object can be applied directly over a preceding one, and several colors can be applied in immediate succession. Difficulty has been encountered, however, in keeping the thermoplastic color or paint at a proper consistency to pass through the screen under the action of the squeegee. Attempts have been made to use heaters above the screen to keep the thermoplastic material at a proper temperature, but this has not proved satisfactory because the heaters have to be so located that they will not interfere with the movement of the squeegee over the screen, and the temperature of the material at the surface of the screen cannot be uniformly controlled. Also, infra-red lamps have been tried with indifferent success. Moreover, if the thermoplastic material hardens in the screen, as it may for example between the end of one day's work and the beginning of another, considerable time is lost in getting the screen clear of the hardened thermoplastic material.

I have invented a novel method and apparatus for heating a body of thermoplastic or resinous color compound resting on a screen, which overcome the aforementioned objections and, in addition, afford a uniform, easily controlled heating so that the color may be constantly maintained at just the right fluidity for ready flow through the interstices of the screen. In a preferred embodiment and practice, I provide means for heating the screen by electrical resistance, the heat generated in the screen being thus immediately available for heating the color layer thereon.

I preferably use a screen formed of fine mesh metal wires, and connect opposite ends or opposite edges of the screen with a source of electric current whereby the wires are heated by their resistance to the passage of current therethrough, and the body of color material which lies over the wires is thus heated and kept at a proper viscosity or condition of fluidity, and the heat is applied so that the color composition is in just the right condition to pass through the screen. However I may use in place of a wire screen a silk screen with an overlying series of wires or wire screen immediately adjacent thereto and the electric current may be passed through such wires or wire screen, keeping the temperature of the thermoplastic part at just the proper point to flow through the silk screen. Alternatively to this, the silk or other fabric screen may have conducting wires or resistor wires woven directly into it at suitably spaced intervals. These thermoplastic colors are normally hard solids which may be liquified by heat. The melting points of the different thermoplastic colors vary and therefore the temperature that must be used in maintaining the necessary viscosity of the fluid thermoplastic will depend upon the viscosity characteristics of the different thermoplastics.

A complete understanding of the invention may be obtained from the following detailed description and explanation thereof which refer to the accompanying drawings illustrating the preferred embodiment and practice. In the drawings:

Fig. 3 is a bottom view of the screen showing the pattern to be applied to the ware in one color;

Fig. 4 is a partial view similar to Fig. 3 showing the pattern to be applied in another color;

Fig. 5 is a perspective view showing a piece of ware having the complete pattern applied thereto;

Fig. 6 is a diagrammatic view showing the rear of the power pack for supplying low-voltage heating current from a house-current supply, and the wiring connections between the several elements thereof;

Fig. 7 is a more or less schematic view showing a longitudinal section through a screen wherein the stencil screen itself is of silk or other fabric and the electrical conducting and heating screen is immediately above it; and Fig. 8 is a transverse section through a screen formed of fabric with longitudinally-extending conducting wires replacing the threads at spaced intervals in the screen.

Figure 2:
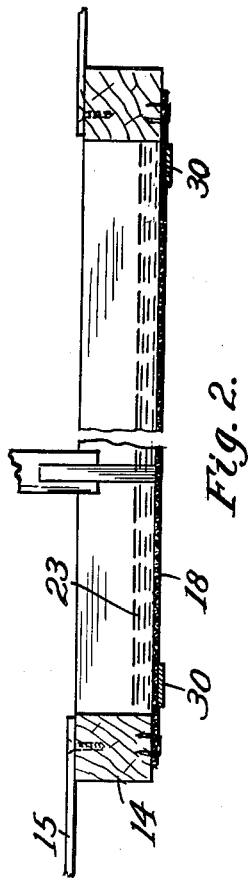
Fig. 2 is a partial section through the screen and the body of color thereon, parts being shown in elevation.
Figure 1:
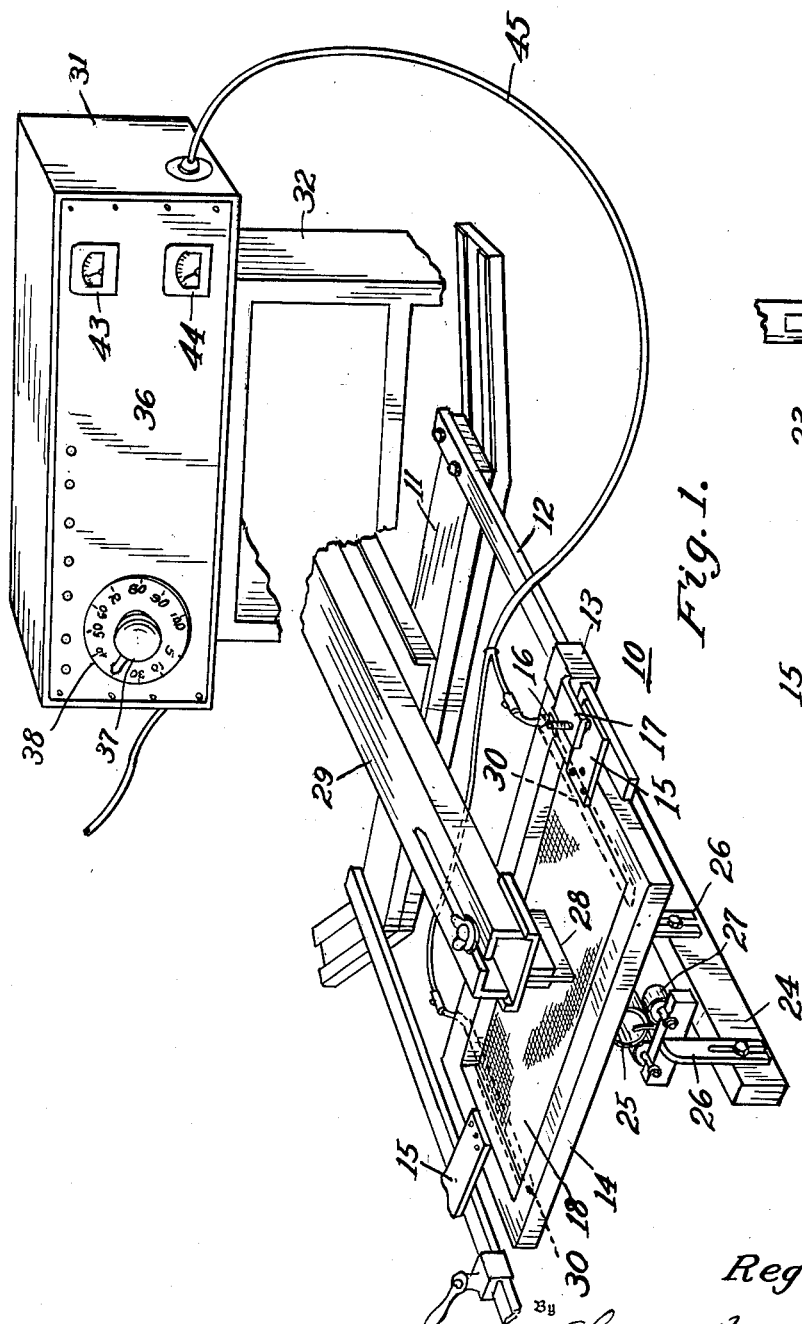
Fig. 1 is a perspective view of an apparatus for applying color to ware, having the invention incorporated therein.

Referring now in detail to the drawings, and, for the present, to Figs. 1 and 2, an apparatus for applying color to ceramic ware or other objects to be decorated through a screen is indicated generally at 10. It comprises a cross beam 11 suitably supported, spaced parallel rails 12 extending forwardly therefrom, and clamping blocks 13 slidable along the rails. A screen frame 14 has tongues 15 extending outwardly from both ends thereof adapted to be clamped to the rails 12 by thumbscrews 16. These screws are threaded through tapped holes in lugs 17 projecting forwardly from blocks 13. A screen 18 is stretched across and overlies the frame 14, being secured in any suitable manner to the lower surface thereof as clearly shown in Fig. 2. The screen is appropriately masked to leave unobstructed the pattern which it is desired to apply to the ware in color. Such a pattern is shown at 19 in Fig. 3 and another at 20 in Fig. 4, the pattern 20 being formed on a second screen 21 carried by a frame 22. The patterns 19 and 20 are complementary parts of an entire multi-color design. The two screens are mounted in different color-applying mechanisms so that a two-color design, for example, may be laid on in successive steps. While I specifically mention two colors, there may be a succession of several colors. A layer 23 of thermoplastic color, e. g., green, is placed on screen 18, while a layer of contrasting color, such as red or yellow, is carried by screen 21.

The ware or other object to which the design is to be applied is held in color-receiving position by a reciprocating arm 24. In the illustrated embodiment, the ware is a tumbler 25. It is carried by a pair of posts 26 adjustably mounted on the arm and fitted with spaced studs 27 of resilient material such as rubber or the like. Color is forced through the unobstructed interstices of the screen by a squeegee 28 which is a blade of rubber or the like mounted on an arm 29 extending above the screen and oscillated lengthwise thereof by known means (not shown). The squeegee 28 wipes across the screen and deposits a thin film of thermoplastic on the ware which hardens almost instantly. The squeegee merely modifies the surface tension of the fluid thermoplastic to permit a thin film to pass through the screen.

In order to maintain the layer of color on the screen at the proper temperature, I provide means to cause a flow of electric current through the screen, if of wire. If the screen proper be of fiber such as silk, I either weave fine conducting wires therein along with the silk threads, or provide a supplemental wire screen adjacent the silk, preferably above it. Instead of a wire screen, a series of conductor wires separate from the patterned screen, but positioned thereadjacent, could be employed. In any event, the screen frame 14 must be of insulating material to prevent short-circuiting the screen or other conductor wires which are heated by their resistance on the passage of electric current therethrough. Conducting strips 30 are brazed or soldered to the screen 18, for example, adjacent the ends thereof, and constitute terminals or electrodes to which conductors or lead wires extending from a current source may be connected. This arrangement prevents localized heating or sparking. With this arrangement, it will be apparent that current will flow through the longitudinal screen wires and thereby generate heat therein. By suitably controlling the current flow, the amount of heat generated may be varied as desired.

A power pack 31 is shown adjacent the position of the operator of the color-applying apparatus, for the purpose of converting and controlling electrical energy from a source of supply such as the usual commercial power circuit. As shown in Fig. 1, the power pack is mounted on a supporting frame 32 standing back of the beam 11 where it is in full view of and conveniently accessible to the operator. The elements composing the pack are shown best in Fig. 6. They include a step-down transformer 33 and a variable reactor 34 mounted in an enclosing case 35. The operating shaft of the reactor extends through the front panel 36 of the case and is provided with a knob 37 having a pointer cooperating with a graduated scale 38. A receptacle 39 at one end of the case is adapted to accommodate a plug 40 on a two-conductor cable connected to any convenient house-current supply. A fuse 41 is connected in one side of the circuit from the receptacle to the reactor. The reactor is connected to the primary winding of the transformer in the known manner so as to vary the proportion of the line voltage impressed on the latter, in order correspondingly to control the secondary voltage.

An output receptacle 42 at the other end of the case is connected across the secondary winding of the transformer. A voltmeter 43 is connected across the secondary and an ammeter 44 in series therewith. These meters are mounted on the front panel 36 with their faces exposed through openings therein. A two-conductor cable 45 has a plug at one end adapted to cooperate with receptacle 42, and has the other ends of its conductors connected to terminal strips 30 as clearly shown in Figs. 1 and 6. By this arrangement and connection of the elements of the power pack, I am enabled to apply reduced voltage to the terminals 30, thereby causing sufficient current to flow through the screen wires to heat them to a temperature that will just suffice to maintain the color layer 23 in proper fluid condition. The applied voltage may be easily varied by adjusting the reactor 34. This voltage is indicated on voltmeter 43 and the current flowing through the screen on ammeter 44. It is thus possible for the operator to keep a close check on the heating current at all times and make adjustment therein, as may be necessary.

The current used in the screen is preferably a low voltage current of sufficiently high amperage so that the operation can be carried on without danger to workers or to the operators who may from time to time run a metal spatula or paint knife over the screens while they are in operation, or who may be holding pieces of metal ware while the decoration is being applied, and of course by using spatulas with insulating handles, danger may be avoided even with higher voltages. It will also be understood that where feasible the same resistance heating of the wires may be effected by the use of a high frequency field arranged to induce currents in the wires.

In the case of a silk screen, conductor wires woven therein as mentioned above may be secured to the terminal strips 30 or a separate wire screen placed above it and the strips brazed or soldered thereto. The only essential requirement is that the electric-resistance heating elements be in heat-exchange relation to the color layer, and adjacent the patterned screen so that they will not interfere with the wiping of color therethrough by the squeegee. In any case, the conducting wires serve in the manner of immersion heaters to generate heat in the color layer itself immediately adjacent the plane in which the color is forced through the screen into the ware.

In Fig. 7 I have shown one modification in which the silk or fabric screen is designated 50, and 51 is the frame which supports the screen, and which is formed of insulating material. Immediately overlying the fabric screen 50 are resistance wires preferably in the form of a wire mesh screen 52, and current is supplied to opposite edges or opposite ends of the wires or screen 52 by current supply wires 53 and 54. In the modification illustrated in Fig. 8, the textile fabric forming the stencil is designated 55, but certain of the longitudinally-extending threads are replaced by fine wire threads designated 56, the wires being at suitably spaced intervals. The supporting frame is designated 57. In this instance current is applied to opposite ends of the wires 56. In Fig. 7 the overlying screen is in intimate contact with the silk screen, and so closely associated therewith as to form in effect a part thereof, and in Fig. 8 the conducting wires associated with the screen do actually constitute a part of the screen.

A silk screen is well adapted for placing sharp patterns on wares such as glassware. The glassware, for example, when placed in the screening frame is cold and will act to congeal the thermoplastic resinous color compound particularly in the interstices of the silk screen. By the present invention wherein the heating element is the screen itself or is in direct contact with or within the screen, the heating may be accurately controlled to keep the screen and color compound in proper condition for transfer to the ceramic ware. Further, with large patterns, using a plurality of screens, the best results may be obtained by controlling the heat to have different viscosities of the color compounds for different portions of the pattern.

It will be apparent from the foregoing that the invention provides a simple, efficient method of heating color during application to ceramic ware, which may be easily practiced, and an apparatus therefor which is readily adaptable to existing color-applying mechanisms, requiring but little skill in the operation thereof, beyond reading the two meter dials and adjusting the applied voltage to render the color more or less fluid, to suit various operating conditions.

If the thermoplastic or resinous material cools in the screen during an interruption to the operation of the screen, the material in the screen that hardens upon cooling will be the first material melted when the current is again turned on, so that a minimum loss of time is suffered in putting the machine into operation and clearing the stencil when it is again put into use. While I have referred especially to thermoplastic colors, various compounds not strictly considered thermoplastics, as monomeric or partially polymerized resinous or plastic materials, may also be used with heat, and such materials are comprehended herein as thermoplastic materials.

I claim:

1. A method of printing a non-smearing design of a solid thermoplastic color ink on a ware comprising, providing a porous screen coated with a masking material to form an open mesh design on the screen, placing a thermoplastic printing color ink on the screen to cover the design to be printed, generating and maintaining heat in the design surface of the screen to develop a uniform controlled temperature therein to melt the thermoplastic and to produce a proper viscosity on the screen for the thermoplastic to pass through the screen under a squeegee pressure to develop only a printing film on the ware, placing the ware to receive the printed design under the design of the screen and positively pushing the fluid thermoplastic through the screen to develop a design of the thermoplastic on the ware corresponding to the design of the screen, maintaining the temperature of the ware below the melting point of the thermoplastic to cause the film to set almost instantly to a non-tacky, non-smearing print.

2. The method of applying a thermoplastic color design to a solid ware as defined in claim 1 in which the heat is generated in the screen surface by an electrical resistance heating.

3. The method of applying a thermoplastic color design to a solid ware as defined in claim 2 in which the electrical resistance heating has an electric current control for maintaining different temperatures in the screen in accordance with the viscosity characteristics of the thermoplastic colors being used.

4. The method defined in claim 1 in which the wiping action on the screen places sufficient pressure on the fluid thermoplastic to modify its surface tension and cause only a sufficient quantity of thermoplastic to pass through the screen to deposit a thin film on the ware, which sets and hardens almost instantly.

5. A screening apparatus for applying thermoplastic colors to wares comprising a supporting frame, a fabric screen attached to the frame, masked and unmasked areas on the fabric defining a desired pattern, a ware holder positioned under the screen at the position of the pattern, a series of closely spaced electrical resistance wires contacting the surface of the fabric over the area of the pattern, an electrical terminal connected with said series of resistance wires at each of the opposite sides of the frame, means for supplying electrical power to said heating wires to melt and make fluid a thermoplastic on the screen, and a squeegee mounted on an arm to move over the screen in contact with the thermoplastic to place sufficient pressure on the heated thermoplastic to force a thin film of thermoplastic through the screen to be deposited on the ware.

6. The screening apparatus defined in claim 5 in which the fabric screen is silk having resistance wires woven therein.

7. Apparatus for applying a solid thermoplastic coloring material to the surface of an object comprising a tray for holding thermoplastic coloring material, a stencil constituting the bottom of the tray, said stencil forming the design to be transferred to the object to be coated, a squeegee in the tray for forcing thermoplastic material through the stencil, and an electric heater integrated with and forming part of the stencil for heating the thermoplastic material in the tray and maintaining it in a fluid condition and of the desired consistency at the level of the stencil and in the interstices of the screen.

References Cited in the file of this patent

UNITED STATES PATENTS

| | | |
|---|---|---|
| 1,035,614 | Low et al. | Aug. 13, 1912 |
| 1,961,829 | Rutoskie et al. | June 5, 1934 |
| 2,165,970 | Jaspers | July 11, 1939 |
| 2,239,619 | Murgatroyd | Apr. 22, 1941 |
| 2,339,423 | Pollard | Jan. 18, 1944 |
| 2,510,999 | Oldofredi | June 13, 1950 |